US008875576B2

(12) United States Patent
Swanson et al.

(10) Patent No.: US 8,875,576 B2
(45) Date of Patent: *Nov. 4, 2014

(54) APPARATUS AND METHOD FOR PROVIDING AN IN-PLANE INERTIAL DEVICE WITH INTEGRATED CLOCK (75) Inventors: Paul D. Swanson, Santee, CA (US); Richard L. Waters, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/425,631

(22) Filed: Mar. 21, 2012

(65) Prior Publication Data
US 2013/0247669 A1    Sep. 26, 2013

(51) Int. Cl.
*G01C 19/56* (2012.01)

(52) U.S. Cl.
USPC ........................................................ 73/504.12

(58) Field of Classification Search
CPC .................. G01C 19/5719; G01C 19/5762
USPC ............................................. 73/504.12, 510
See application file for complete search history.

(56) References Cited

U.S. PATENT DOCUMENTS

| 5,023,503 | A | 6/1991 | Legge et al. |
| 6,289,733 | B1 | 9/2001 | Challoner et al. |
| 6,674,141 | B1 | 1/2004 | Kubena et al. |
| 6,838,806 | B2 | 1/2005 | Chua et al. |
| 7,093,487 | B2 | 8/2006 | Mochida |
| 7,168,317 | B2 * | 1/2007 | Chen et al. .................. 73/504.04 |
| 7,284,429 | B2 | 10/2007 | Chaumet et al. |
| 7,832,271 | B2 | 11/2010 | Mita et al. |
| 8,650,955 | B2 * | 2/2014 | Swanson et al. ........... 73/504.12 |
| 2004/0217388 | A1 | 11/2004 | Kubena et al. |
| 2010/0116630 | A1 | 5/2010 | Pinkerton |

OTHER PUBLICATIONS

Unpublished U.S. Appl. No. 13/168,603, filed Jun. 24, 2011, Titled "Apparatus and Methods for Time Domain Measurement of Oscillation Perturbations," by Paul D. Swanson et al.
Unpublished U.S. Appl. No. 13/276,948, filed Oct. 19, 2011, Titled "Resonator with Reduced Acceleration Sensitivity and Phase Noise Using Time Domain Switch," by Paul D. Swanson et al.
Unpublished U.S. Appl. No. 13/282,062, filed Oct. 26, 2011, Titled "Auto-Ranging for Time Domain Inertial Sensor," by Paul D. Swanson et al.
Unpublished U.S. Appl. No. 13/288,841, filed Nov. 3, 2011, Titled "Oscillation Apparatus with Atomic-Layer Proximity Switch," by Andrew Wang et al.
Unpublished U.S. Appl. No. 13/353,205, filed Jan. 18, 2012, "Titled Time Domain Switched Gyroscope," by Paul D. Swanson et al.

* cited by examiner

*Primary Examiner* — John Chapman, Jr.
(74) *Attorney, Agent, or Firm* — SPAWAR Systems Center Pacific; Kyle Eppele; J. Eric Anderson (57) ABSTRACT

An in-plane, monolithically-integrated, inertial device comprising: a support structure and first and second spring mass systems springedly coupled to the support structure. The first spring mass system comprises first and second time domain digital triggers configured to measure rotation and displacement respectively of the support structure about a first axis and along an orthogonal second axis respectively. The second spring mass system comprises third and fourth time domain digital triggers configured to measure acceleration and displacement respectively of the support structure about the second axis and along the first axis respectively.

20 Claims, 8 Drawing Sheets

APPARATUS AND METHOD FOR PROVIDING AN IN-PLANE INERTIAL DEVICE WITH INTEGRATED CLOCK

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 100993.

BACKGROUND OF THE INVENTION

Conventional mass/spring based inertial sensing devices such as accelerometers or gyroscopes measure force or rotation along a single axis. Since most applications occur in three dimensional space, three orthogonally directed accelerometers and three orthogonally directed gyroscopes are needed. In order to reduce cost, size and complexity it would be desirable to build all the sensors in the same plane using the same standard MEMS semiconductor processing techniques. Also, in the interest of reducing cost and size, it would be desirable for the six measurements be made using the minimum number of springed proof masses. Accelerometers require a springed proof mass with the direction of motion in the direction of measured force. Proof-mass based gyroscopes require an oscillating proof-mass moving orthogonal to the axis of measured spin, as well as spring proof-mass(es) on the oscillating proof mass to measure the Coriolis forces caused by rotation. There exists a need for a device that can measure all six axes and can be fabricated on the same substrate.

SUMMARY

Disclosed herein is an in-plane, monolithically-integrated, inertial device comprising: a support structure and first and second spring mass systems springedly coupled to the support structure. The first spring mass system is configured to use a first time domain digital trigger operatively coupled between a first drive mass and a first sense mass to measure rotation of the support structure about a first axis. The first spring mass system is further configured to use a second time domain digital trigger operatively coupled between the support structure and the first drive mass to measure acceleration of the support structure in a second direction that corresponds to direction along a second axis, which is orthogonal to the first axis. The second spring mass system is configured to use a third time domain digital trigger operatively coupled between a second drive mass and a second sense mass to measure rotation of the support structure about the second axis. The second spring mass system is further configured to use a fourth time domain digital trigger operatively coupled between the support structure and the second drive mass to measure acceleration of the support structure in a first direction that corresponds to direction along the first axis.

Another embodiment disclosed herein includes a method for providing a single monolithic device to measure the rotation of a support structure about first, second, and third axes of a three-axis orthogonal coordinate system as well as the acceleration of the support structure in first, second, and third directions corresponding to directions along the first, second, and third axes respectively. The first step provides for driving a first drive mass to oscillate with respect to the support structure in the second direction. The second step provides for measuring rotation of the support structure about the first axis by monitoring a time interval between successive trigger events from a first pair of third-direction-stacked proximity switches coupled between the first drive mass and a first sense mass which is springedly coupled to the first drive mass such that movement of the first sense mass with respect to the first drive mass is substantially restricted to movement in the third direction. The third step provides for measuring acceleration of the support structure in the second direction by monitoring a time interval between successive trigger events from a second pair of second-direction-stacked proximity switches coupled between the first drive mass and the support structure. The fourth step provides for driving a second drive mass to oscillate with respect to the support structure in the first direction. The fifth step provides for measuring rotation of the support structure about the second axis by monitoring a time interval between successive trigger events from a third pair of third-direction-stacked proximity switches coupled between the second drive mass and a second sense mass which is springedly coupled to the second drive mass such that movement of the second sense mass with respect to the second drive mass is substantially restricted to movement in the third direction. The sixth step provides for measuring acceleration of the support structure in the first direction by monitoring a time interval between successive trigger events from a fourth pair of first-direction-stacked proximity switches coupled between the second drive mass and the support structure. The seventh step provides for measuring rotation of the support structure about the third axis by monitoring a time interval between successive trigger events from a fifth pair of second-direction-stacked proximity switches coupled between the second drive mass and a third sense mass which is springedly coupled to the second drive mass such that movement of the third sense mass with respect to the second drive mass is substantially restricted to movement in the second direction. The eighth step provides for driving a fourth sense mass to oscillate with respect to the support structure in the third direction at the fourth sense mass' resonant frequency. The ninth step provides for measuring acceleration of the support structure in the third direction by monitoring a time interval between successive trigger events from a sixth pair of third-direction-stacked proximity switches coupled between the fourth sense mass and the support structure.

Another embodiment disclosed herein includes a method for providing a monolithic device to measure the rotation of the device about x, y, and z mutually orthogonal axes as well as the acceleration of the support structure in x, y, and z directions corresponding to directions along the x, y, and z axes respectively. The first step provides for forming a support structure in the xy plane of a substrate. The second step provides for forming in the xy plane of the substrate a single-sense-mass gyroscope that is springedly coupled to the support structure, wherein the single-sense-mass gyroscope is configured to use a first time domain digital trigger to measure rotations of the support structure about the x-axis, and wherein the single-sense-mass gyroscope is further configured to use a second time domain digital trigger to measure acceleration of the support structure in the y-direction. The third step provides for forming in the xy plane of the substrate a dual-sense-mass gyroscope that is springedly coupled to the support structure, wherein the dual-sense-mass gyroscope is configured to use a third and fifth time domain digital triggers to measure rotations of the support structure about the y- and z-axes respectively, and wherein the dual-sense-mass gyroscope is further configured to use a fourth time domain digital trigger to measure acceleration of the support structure in the x-direction. The fourth step provides for forming in the xy plane of the substrate an accelerometer that is springedly coupled to the support structure, wherein the accelerometer is configured to use a sixth time domain digital trigger to measure acceleration of the support structure in the z-direction. The fifth step provides for forming in the xy plane of the substrate a dual-mass resonator that is springedly coupled to the support structure, wherein the dual-mass resonator is configured to use a seventh time domain digital trigger to generate a clock signal.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Described herein is an in-plane, monolithically-integrated, inertial device capable of measuring displacement and rotation of a structure about multiple axes (up to three orthogonal directions of force and three orthogonal axes of rotation). The inertial device and its components may be fabricated on the same substrate using the same fabrication process.

Figure 1:
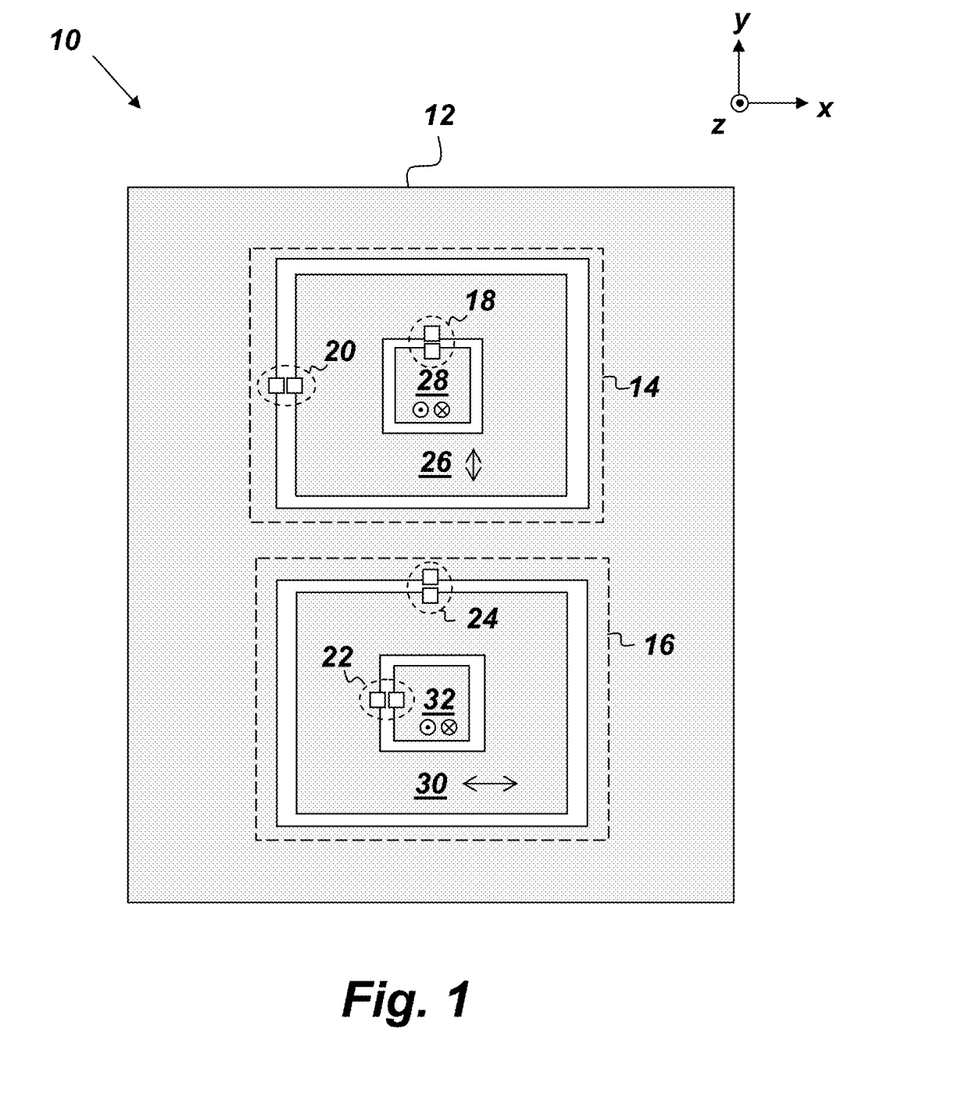
FIG. 1 is a top-view illustration of an in-plane, monolithically-integrated, inertial device.

FIG. 1 depicts an in-plane, monolithically-integrated, inertial device 10. The inertial device 10 may be used in any orientation in any 3-dimensional space. For ease of description, the rotations and accelerations of the various components of the inertial device 10 are described herein with reference to an x-y-z mutually-orthogonal-three-axis coordinate system. The inertial device 10 comprises a support structure 12 and first and second spring mass systems 14 and 16, both of which are monolithically integrated into and springedly coupled to the support structure 12. The first and second spring mass systems 14 and 16 may both be described as vibrating-proof-mass-based gyroscopes. The inertial device 10 may be manufactured on any scale. For example, in one embodiment the inertial device 10 may be monolithically integrated into a micro-electro-mechanical system (MEMS) device. The support structure 12 may be any size and shape, and be made of any material capable of providing rigid support for the inertial device 10 such that the support structure 12 does not significantly flex and/or deform when exposed to lateral and rotational accelerations of the inertial device 10.

The first spring mass system 14 is configured to use a first time domain digital trigger 18 to measure rotation of the support structure 12 about the x-axis. The first spring mass system 14 is also configured to use a second time domain digital trigger 20 to measure acceleration of the support structure 12 in the y-direction. The second spring mass system 16 is configured to use a third time domain digital trigger 22 to measure rotation of the support structure 12 about the y-axis. The second spring mass system 16 is also configured to use a fourth time domain digital trigger 24 to measure acceleration of the support structure 12 in the x-direction.

The first spring mass system 14 comprises a first drive mass 26 and a first sense mass 28. The first trigger 18 is operatively coupled between the first drive mass 26 and the first sense mass 28. The second trigger 20 is operatively coupled between the support structure 12 and the first drive mass 26. The second spring mass system 16 comprises a second drive mass 30 and a second sense mass 32. The third trigger 22 is operatively coupled between the second drive mass 30 and the second sense mass 32. The fourth trigger 24 is operatively coupled between the support structure 12 and the second drive mass 30.

The first drive mass 26 may be springedly coupled to the support structure 12 such that movement of the first drive mass 26 with respect to the support structure 12 is substantially restricted to movement in the y-direction, as shown by the bi-directional arrows on the first drive mass 26. The first drive mass 26 is driven to oscillate with respect to the support structure 12 in the y-direction. The first sense mass 28 may be springedly coupled to the first drive mass 26 such that movement of the first sense mass 28 with respect to the first drive mass 26 is substantially restricted to movement in the z-direction, as depicted in FIG. 1 by the two circles (one with a dot therein and the other with an "X" therein) over the first sense mass 28 indicating movement in and out of the page. The second drive mass 30 may be springedly coupled to the support structure 12 such that movement of the second drive mass 30 with respect to the support structure 12 is substantially restricted to movement in the x-direction, as shown by the bi-directional arrows over the second drive mass 30. The second drive mass 30 is driven to oscillate with respect to the support structure 12 in the x-direction. The second sense mass 32 may be springedly coupled to the second drive mass 30 such that movement of the second sense mass 32 with respect to the second drive mass 30 is substantially restricted to movement in the z-direction, as depicted in FIG. 1 by the two circles (one with a dot therein and the other with an "X" therein) over the second sense mass 32 indicating movement in and out of the page.

Each of the time domain digital triggers may be any apparatus capable of producing digital signals corresponding to various relative positions of the two masses between-which each time domain digital trigger is coupled. Each of the time domain digital triggers is configured to pass through at least one closed state and at least one open state during each relative oscillation of the two corresponding masses to which the given time domain digital trigger is coupled. By way of example, consider the first digital trigger 18 which is capable of producing digital signals as the first sense mass 28 passes through various reference positions with respect to the first drive mass 26. The first digital trigger 18 passes through closed and open states with each oscillation of the first sense mass 28 with respect to the first drive mass 26. Each time the first sense mass 28 passes a first reference position with respect to the first drive mass 26 the first digital trigger 18 passes through a closed state. Thus, displacement from the first reference position of the first sense mass 28 with respect to the first drive mass 26 may be discovered by monitoring the state of the first digital trigger 18.

Each of the time domain digital triggers experiences a change in state based on relative positional changes of the two corresponding masses to which the given time domain digital trigger is coupled. The corresponding reference position in which each time domain digital trigger is in a closed state may be a zero force position or any other desired reference position. A purpose of the time domain digital triggers is to localize the position of one mass with respect to another such that an accurate acceleration-independent phase measurement can be performed-thereby increasing stability of a phased-locked loop closure and reducing overall phase noise and jitter of the inertial device 10.

Suitable examples of a time domain trigger include any proximity switch capable of generating a finite width current pulse. A suitable example of a proximity switch is an electron tunneling proximity switch that comprises at least one pair of electron tunneling tips—one tip mounted on one mass and another tip mounted on a different mass. Under this arrangement, the two tips are aligned with each other such that as one mass moves with respect to the other mass the two tips pass within close proximity to each other (without physically touching each other) such that a current pulse may pass between the tips. When a current pulse passes between the two tips the electron tunneling proximity switch is deemed to be in a closed state. The current pulse itself can be amplified to the rails via a transimpedance amplifier and the leading and or trailing edges of the pulse may be used to localize the position of one of the masses with respect to the other mass. A more detailed description of how this can be performed is described below with respect to FIGS. 2A-2C and 8 and may be found in U.S. patent application Ser. No. 13/276,948, titled "Resonator with Reduced Acceleration Sensitivity and Phase Noise Using Time Domain Switch," filed 19 Oct. 2011, which is incorporated by reference herein in its entirety. Other examples of proximity switches include capacitive switches, optical shutter switches, and magnetic switches. In addition, any of the proximity switches may be configured to pass through multiple closed states corresponding to multiple reference positions during a single oscillation period of one mass with respect to another.

Figure 2A:
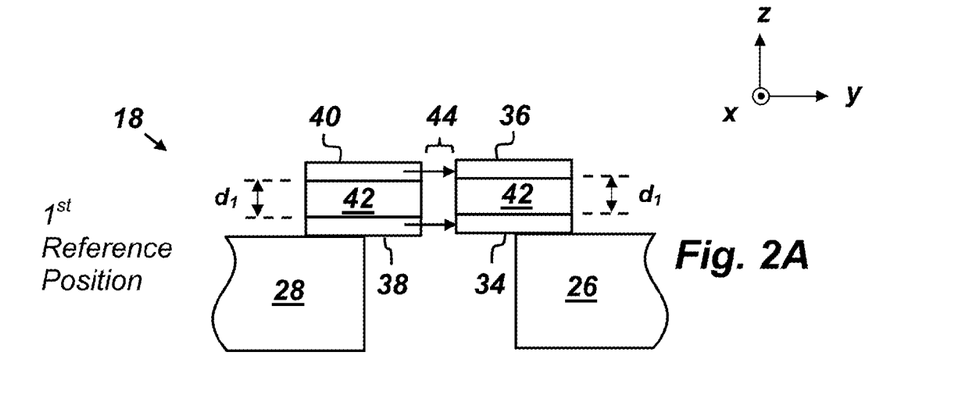
FIGS. 2A-2C are side view illustrations of an electron tunneling proximity switch in multiple reference positions.
Figure 2B:
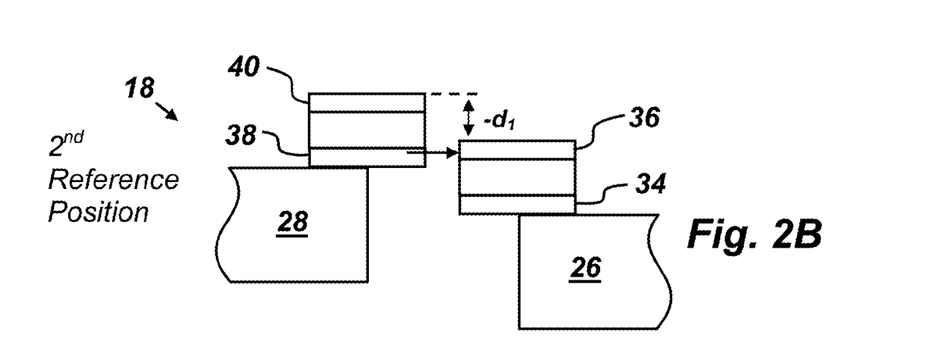
Figure 2C:
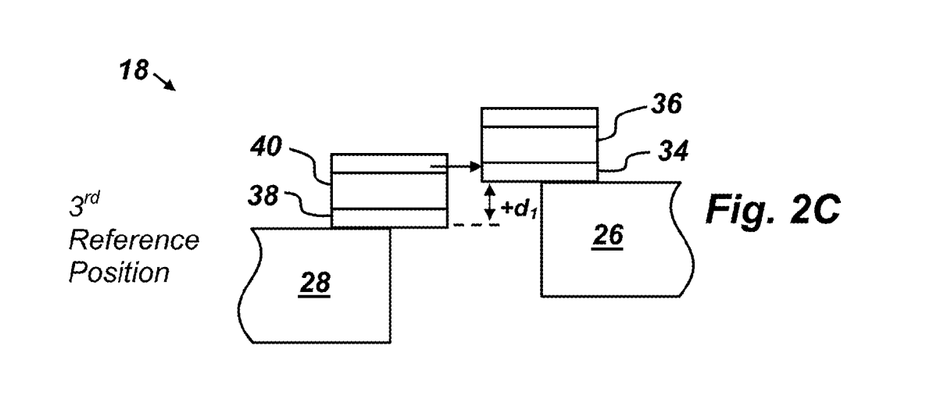

FIGS. 2A-2C illustrate an embodiment of an electron tunneling proximity switch configured to pass through multiple closed states corresponding to multiple reference positions of the two masses to which the proximity switch is coupled during a single oscillation period. In FIGS. 2A-2C, the description of the electron tunneling proximity switch is made with reference to the first digital trigger 18. However, it is to be understood that the general principles described herein may be applied to any of the time domain digital triggers. In the embodiment of the first digital trigger 18 shown in FIGS. 2A-2C, the first digital trigger 18 comprises z-direction-stacked first and second electron tunneling tips 34 and 36 mounted on the first drive mass 26. The first and second tips 34 and 36 are aligned with each other in the z-direction and separated from each other in the z-direction by a distance $d_1$. The first digital trigger 18 in this embodiment also comprises third and fourth z-direction-stacked electron tunneling tips 38 and 40 mounted to the first sense mass 28. The third and fourth tips 38 and 40 are aligned with each other in the z-direction and separated from each other in the z-direction by the distance $d_1$. The first and second tips 34 and 36 and the third and fourth tips 38 and 40 can be separated from each other by a dielectric spacer 42. The first, second, third, and fourth tips 34, 36, 38, and 40 are positioned with respect to each other such that when the first sense mass 28 is in the first reference position, such as is depicted in FIG. 2A, a current pulse passes from the first and second tips 34 and 36 over a gap 44 to the third and fourth tips 38 and 40 respectively. This embodiment of the first digital trigger 18 also comprises second and third reference positions of the first sense mass 28 with respect to the first drive mass 26. The first sense mass 28 is in the second reference position when the first sense mass 28 is displaced from the first reference position in the z-direction by the distance $-d_1$, such as is shown in FIG. 2B. In the second reference position, the first digital trigger 18 is in a closed state such that a current pulse may pass from the second tip 36 to the third tip 38. The first sense mass 28 is in the third reference position when the first sense mass 28 is displaced in the z-direction by the distance $+d_1$, such as is shown in FIG. 2C. In the third reference position, the first proximity switch 18 is in a closed state such that a current pulse passes from the first tip 34 to the fourth tip 40. When the first sense mass 28 and the first drive mass 26 are aligned in the first, second, or third reference positions tunneling discharge current pulses 45a, 45b, and 45c may be induced respectively. The tunneling discharge current pulses 45a, 45b, and 45c may be sensed and may be amplified by low-noise current amplifiers as described in further detail with respect to FIG. 8, below.

Figure 3:
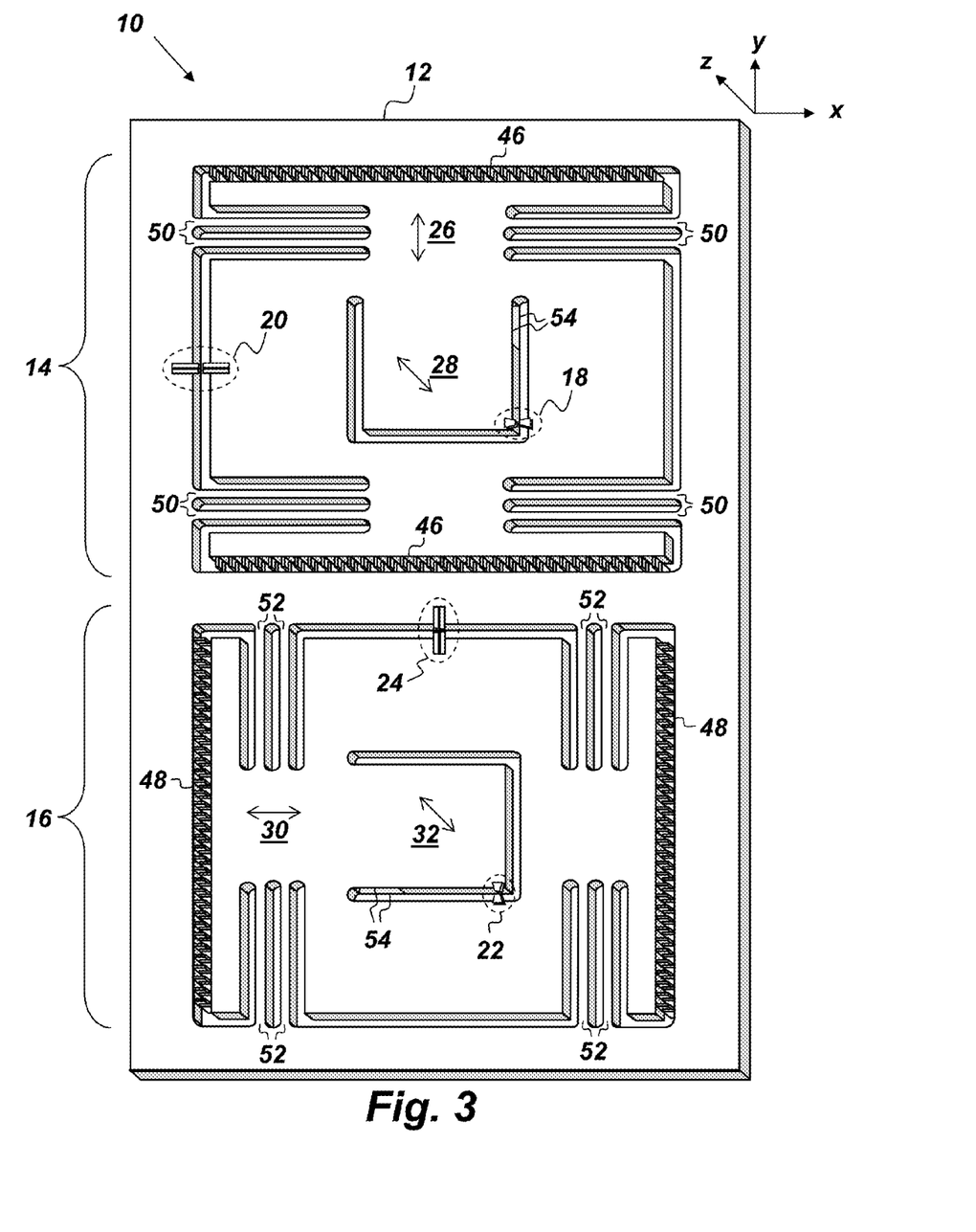
FIG. 3 is a perspective view of another embodiment of the inertial device.

FIG. 3 is a perspective view of an embodiment of the inertial device 10. In this embodiment, the first spring mass system 14 further comprises a first drive mass driver 46 and the second spring mass system 16 further comprises a second drive mass driver 48. The first drive mass driver 46 is configured to cause the first drive mass 26 to oscillate with respect to the support structure 12 in the y-direction. The second drive mass driver 46 is configured to cause the second drive mass 30 to oscillate with respect to the support structure 12 in the x-direction. The first sense mass 28 is springedly coupled to the first drive mass 28 such that movement of the first sense mass 28 with respect to the first drive mass 26 is substantially restricted to movement in the z-direction. The second sense mass 32 is springedly coupled to the second drive mass 30 such that movement of the second sense mass 32 with respect to the second drive mass 30 is substantially restricted to movement in the z-direction. Thus, the first and second sense masses 28 and 32 are decoupled from the first and second drive masses 26 and 30 respectively in the sense direction (i.e., the z-direction). The first sense mass 28 moves in the z-direction with respect to the first drive mass 26 in response to Coriolis forces from rotation of the support structure 12 about the x-axis. The second sense mass 32 moves in the z-direction with respect to the second drive mass 30 in response to Coriolis forces from rotation of the support structure 12 about the y-axis.

Each time the first sense mass 28 passes a first reference position with respect to the first drive mass 26 the first time domain digital trigger 18 passes through a closed state. Thus, displacement from the first reference position of the first sense mass 28 with respect to the first drive mass 26 may be discovered by monitoring the state of the first time domain digital trigger 18. Each time the second sense mass 32 passes a first reference position with respect to the second drive mass 30 the third time domain digital trigger 22 passes through a closed state. Thus, displacement from the first reference position of the second sense mass 32 with respect to the second drive mass 30 may be discovered by monitoring the state of the third time domain digital trigger 22.

The first drive mass 26 may be coupled to the support structure 12 in any manner which restricts movement of the first drive mass 26 with respect to the support structure 12 in the x and z-directions and rotations about the x-y-z axes, but yet allows the first drive mass 26 to elastically move with respect to the support structure 12 in the y-direction. The second drive mass 30 may be coupled to the support structure 12 in any manner which restricts movement of the drive mass with respect to the support structure 12 in they and z-directions and rotations about the x-y-z axes, but yet allows the second drive mass 30 to elastically move with respect to the support structure 12 in the x-direction.

The embodiment of the inertial device 10 shown in FIG. 3 portrays the first drive mass 26 as being coupled to the support structure 12 by compliant spring members 50, which are designed to flex in only the y-direction. Whereas the second drive mass 30 is coupled to the support structure 12 by compliant spring members 52, which are designed to flex in only the x-direction. The first and second drive mass drivers 46 and 48 may be any apparatus capable of causing the first and second drive masses 26 and 30 respectively to oscillate at any desired frequency in the y-direction and the x-direction respectively with respect to the support structure 12. Suitable examples of drive mass drivers include, but are not limited to, variable area actuators, such as electrostatic comb drives (such as are portrayed in FIG. 3), variable gap actuators, such as parallel plate actuators, and other electro-magnetic or piezoelectric mechanisms of actuation. The first and second drive masses 26 and 30 may be driven using a continuous oscillating force or by periodic "delta function" forces in phase with the harmonic resonance of the first and second drive masses 26 and 30 respectively.

The first sense mass 28 may be coupled to the first drive mass 26 in any manner which restricts movement of the first sense mass 28 with respect to the first drive mass 26 in the x and y-directions and from rotating about the x-y-z axes, but yet allows the first sense mass 28 to elastically move with respect to the first drive mass 26 in the z-direction. The second sense mass 32 may be coupled to the second drive mass 30 in any manner which restricts movement of the second sense mass 32 with respect to the second drive mass 30 in the x and y-directions and from rotating about the x-y-z axes, but yet allows the second sense mass 32 to elastically move with respect to the second drive mass 30 in the z-direction. The embodiment of the inertial device 10 shown in FIG. 3 portrays the first and second sense masses 28 and 32 as being coupled to the first and second drive masses 26 and 30 respectively by monolithically-integrated dual-element springs 54 which are designed to flex in only the z-direction.

Figure 4:
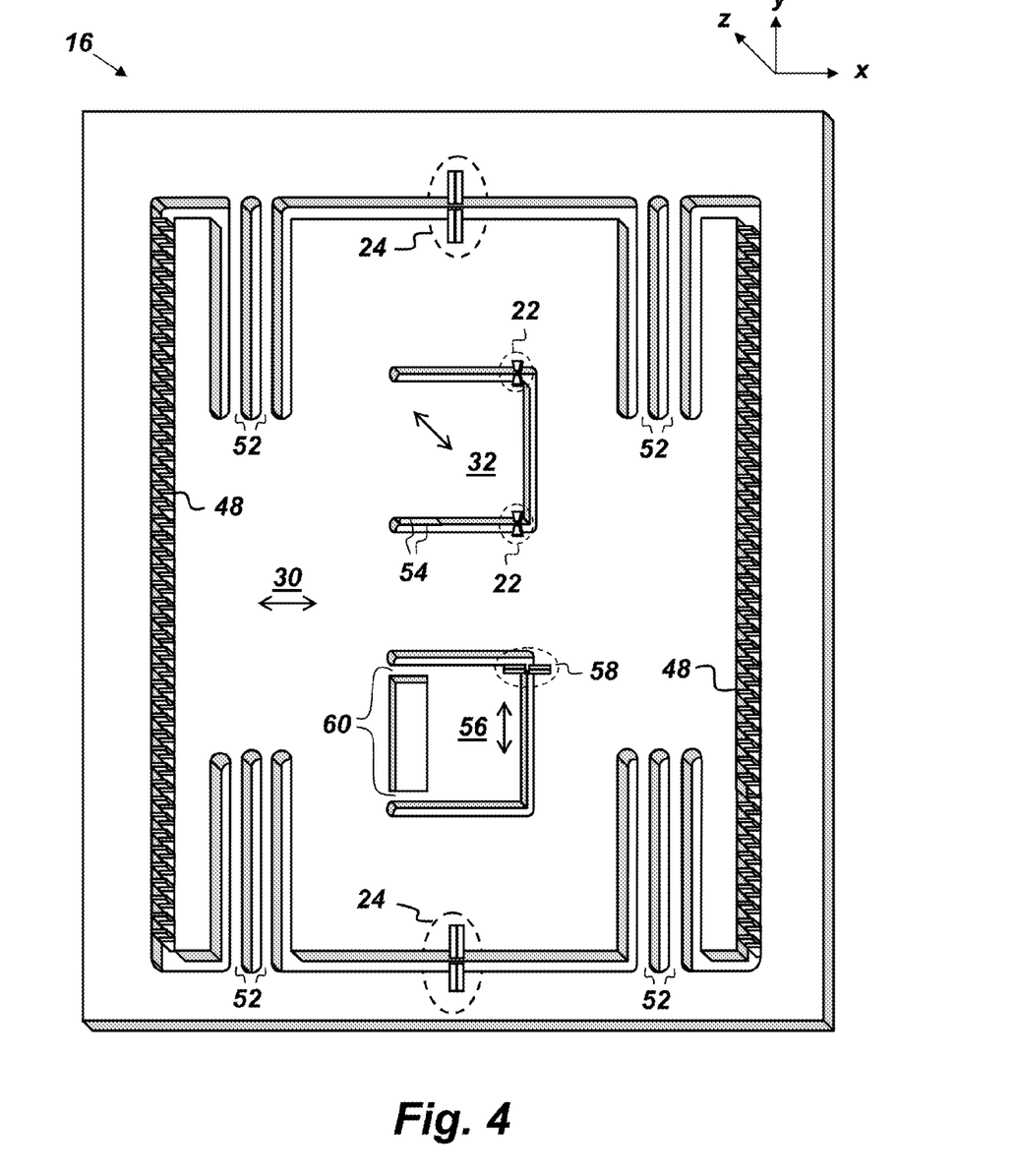
FIG. 4 is a perspective view of a dual mass spring mass system.

FIG. 4 is a perspective view of another embodiment of the second spring mass system 16. In this embodiment, the second spring mass system 16 further comprises a third sense mass 56 and a fifth time domain digital trigger 58. The second spring mass system 16 is further configured to use the fifth time domain digital trigger 58, which is operatively coupled between the second drive mass 30 and the third sense mass 56, to measure rotation of the support structure 12 about the z-axis. The third sense mass 56 is springedly coupled to the second drive mass 30 such that movement of the third sense mass 56 with respect to the second drive mass 30 is substantially restricted to movement in the y-direction. Thus, the third sense mass 56 is configured to move in the y-direction with respect to the second drive mass 30 in response to Coriolis forces from rotation of the support structure 12 about the z-axis.

In FIG. 4, the third sense mass 56 is shown as being coupled to the second drive mass 30 by compliant spring members 60. The fifth time domain digital trigger 58 is a proximity switch coupled between the second drive mass 30 and the third sense mass 56. The fifth time domain digital trigger 58 is configured to be in a closed state each time the third sense mass 56 is in a reference position with respect to the second drive mass 30. The fifth time domain digital trigger 58 may be any apparatus capable of producing digital signals corresponding to various positions of the third sense mass 56 with respect to the second drive mass 30. In other words, the fifth time domain digital trigger 58 may be any device capable of experiencing a change in state based on positional changes of the third sense mass 56 relative to the second drive mass 30. In the embodiment of the second spring mass system 16 depicted in FIG. 4, the fifth time domain digital trigger 58 is shown as comprising four electron tunneling tips. The reference position in which the fifth time domain digital trigger 58 is in a closed state may be a zero force position or any other desired reference position. Rotation of the support structure 12 about the z-axis may be determined by monitoring the state of the fifth time domain digital trigger 58. More than one time domain digital trigger may be added to each sense mass to provide redundancy and/or to increase the accuracy of inertial device 10. For example, in FIG. 4, there are two third digital triggers 22 coupled between the second sense mass 32 and the second drive mass 30, and there are two fourth digital triggers 24 coupled between the second drive mass 30 and the support structure 12. Thus, this embodiment of the second spring mass system 16 provides a gyroscope with a single drive mass and two sense masses (uncoupled in their respective sense directions) configured to measure two orthogonal rotational forces.

Figure 5:
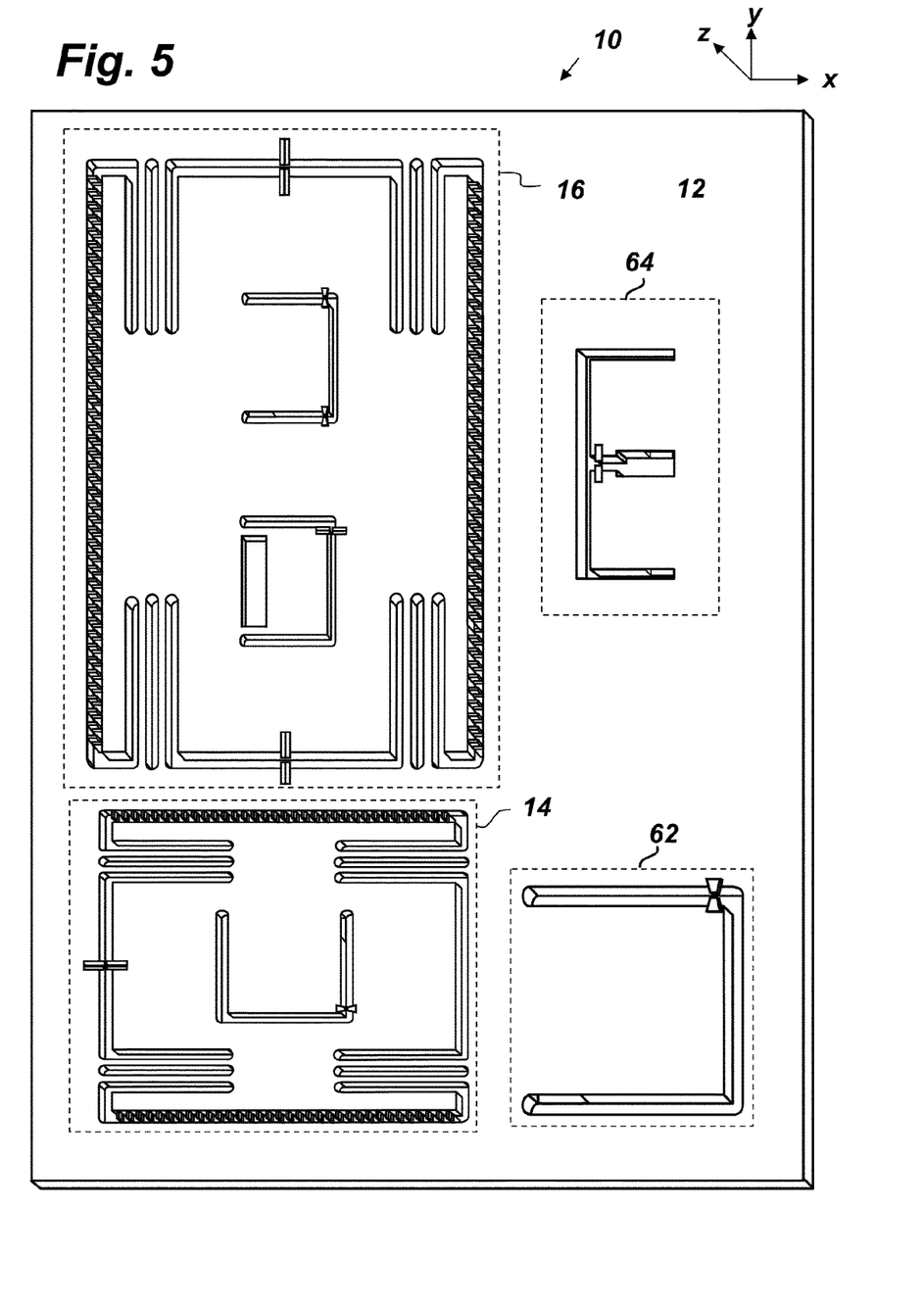
FIG. 5 is a perspective view of another embodiment of the inertial device.

FIG. 5 shows another embodiment of the inertial device 10. In this embodiment, in addition to the first spring mass system 14 and the dual-sense-mass embodiment of the second spring mass system 16, the inertial device 10 further comprises an accelerometer 62 and a dual-mass resonator 64 integrated into the support structure 12. The accelerometer 62 is configured to measure acceleration of the support structure 12 in the z-direction. The dual-mass resonator 64 is configured to provide a substantially steady clock signal with reduced phase noise and minimal sensitivity to external perturbations to the support structure 12 and/or other phenomena. The support structure 12, the dual sense mass embodiment of the second spring mass system 16, the first spring mass system 14, the accelerometer 62, and the dual mass resonator 64 may be sealed in a vacuum between two capping wafers.

Figure 6A:
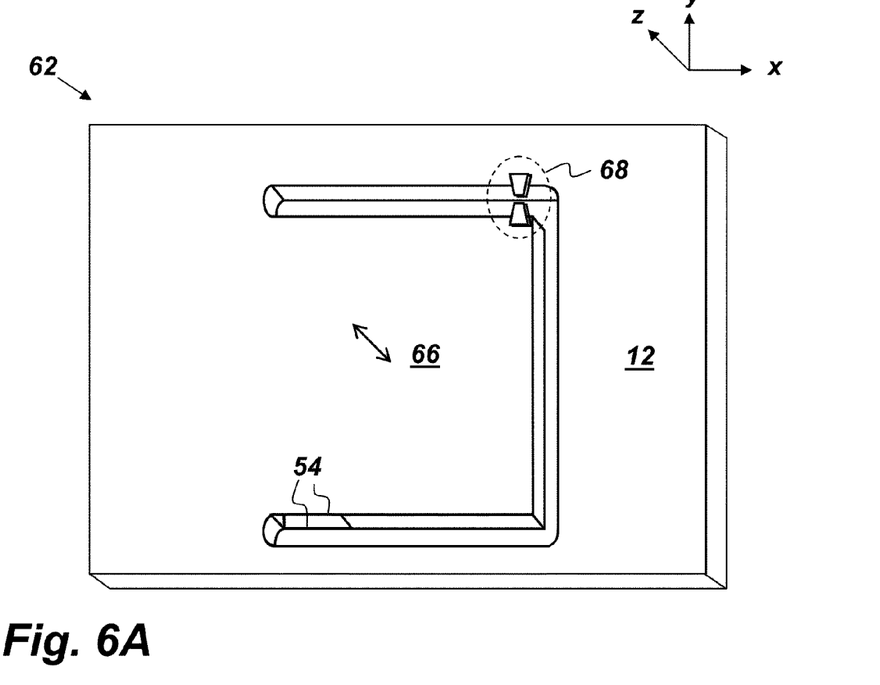
FIG. 6A is a perspective view of an accelerometer.

FIG. 6A is a perspective view of an embodiment of the accelerometer 62. The accelerometer 62 comprises a fourth sense mass 66 and a sixth time domain digital trigger 68. The fourth sense mass 66 may be springedly coupled to the support structure 12 in any manners provided that movement of the fourth sense mass 66 with respect to the support structure 12 is substantially restricted to movement in the z-direction. In the embodiment of the accelerometer 62 shown in FIG. 6A, the fourth sense mass 66 is springedly coupled to the support structure 12 via monolithically-integrated dual-element springs 54. The sixth time domain digital trigger is a proximity switch coupled between the fourth sense mass 66 and the support structure 12 such that the sixth time domain digital trigger 68 is configured to switch from an open state to a closed state each time the fourth sense mass 66 is in a reference position with respect to the support structure 12.

Figure 6B:
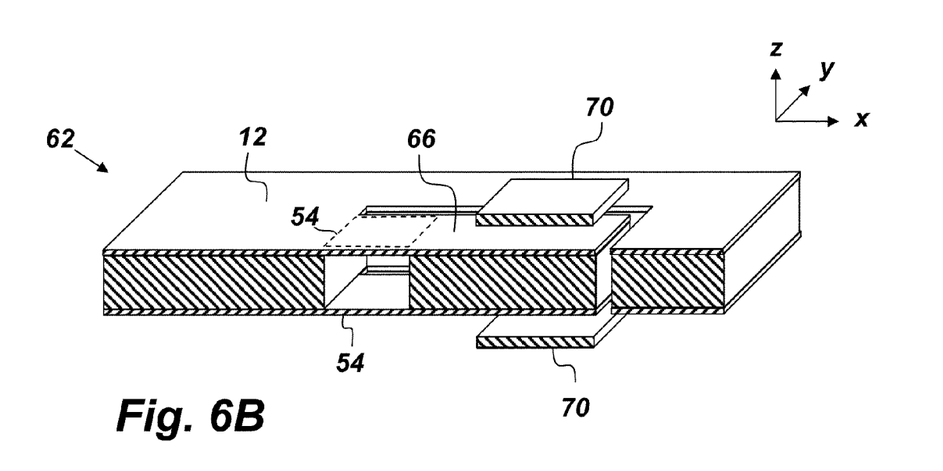
FIG. 6B is a perspective, cross-sectional view of an accelerometer.

FIG. 6B shows a cross-sectional perspective view of an embodiment of the accelerometer 62, which further comprises an accelerometer driver 70 configured to drive the fourth sense mass 66 to oscillate in the z-direction at a resonant frequency of the fourth sense mass 66. The accelerometer driver 70 may be any device capable of causing controlled movement of the fourth sense mass 66 in the z-direction with respect to the drive mass 12. Suitable examples of the accelerometer driver 70 include, but are not limited to variable area actuators, such as electrostatic comb drives, and variable gap actuators, such as parallel plate actuators, as well as other electro-magnetic or piezoelectric mechanisms of actuation. For example, the accelerometer driver 70 may comprise a symmetric pair of upper and lower overlapped capacitive electrodes on either side of the fourth sense mass 66, such as is depicted in FIG. 6B, that can be used to create a velocity vector in the fourth sense mass 66.

Figure 7A:
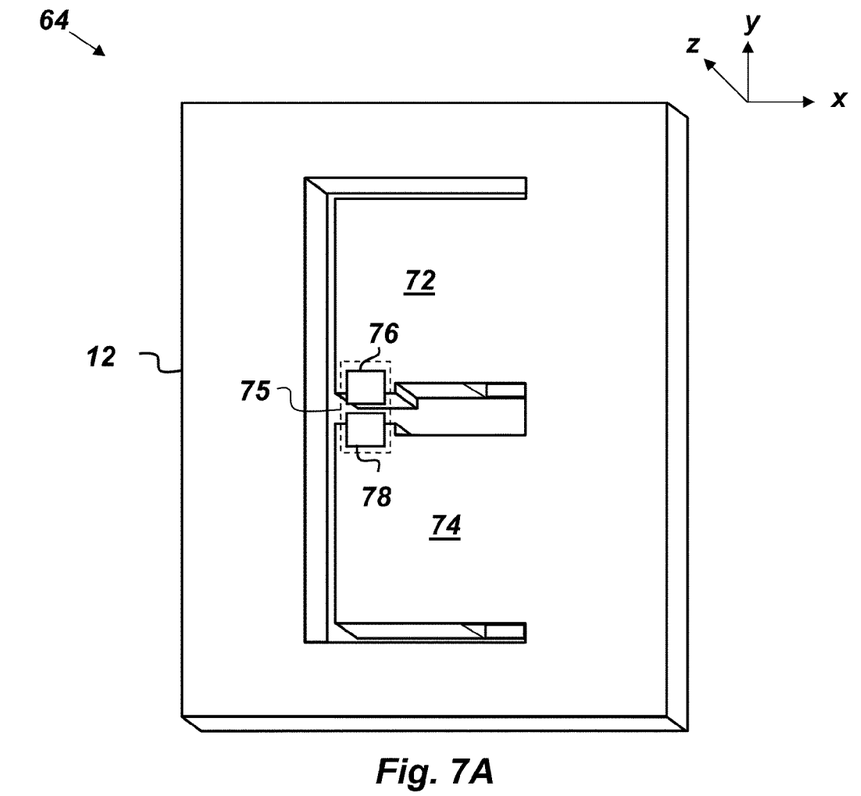
FIG. 7A is a perspective view of a dual mass resonator.
Figure 7B:
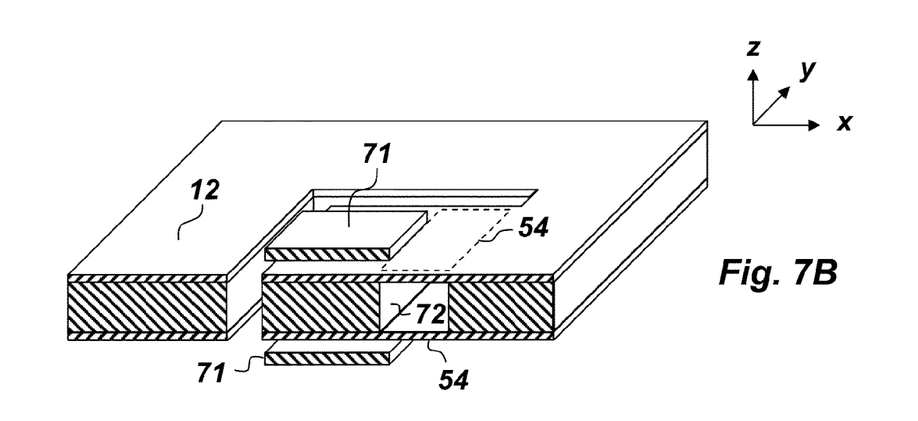
FIG. 7B is a perspective, cross-sectional view of a dual mass resonator.

FIGS. 7A-7B depict perspective views of an embodiment of the dual mass resonator 64. The dual mass resonator 64 is monolithically integrated into the frame 12 and comprises a resonator driver 71, first and second oscillator masses 72 and 74, and a seventh time domain digital trigger 75. The seventh time domain digital trigger 75 comprises first and second relative position switch halves 76 and 78. The resonator driver 71 drives the first oscillator mass 72 to oscillate at the first oscillator mass' resonant frequency. The dual mass resonator 64 is configured such that when the first oscillator mass 72 oscillates with respect to the frame 12 there is relative motion between the first and second oscillator masses 72 and 74. For example, the second oscillator mass 74 may be configured to oscillate out of phase with the first oscillator mass 72. The first and second relative position switch halves 76 and 78 are mounted to the first and second oscillator masses 72 and 74 respectively in any configuration such that during each oscillation of the first oscillator mass 72 the seventh time domain digital trigger 75 passes through a closed state when the first and second relative position switch halves 76 and 78 pass by each other. The first and second oscillator masses 72 and 74, which have substantially the same resonant frequency, are designed to respond in substantially the same manner to external perturbations to the frame 12. Further details about dual mass resonators may be found in U.S. patent application Ser. No. 13/276,948 "Resonator with Reduced Acceleration Sensitivity and Phase Noise Using Time Domain Switch" filed by Paul D. Swanson on 19 Oct. 2011, the contents of which are hereby incorporated by reference in their entirety.

The clock signal from the dual mass resonator 64 may be used to calculate the amplitude of a rotation and/or displacement of the support structure 12 by measuring a time interval between successive trigger events (i.e., closed states) of the corresponding time domain digital trigger.

Figure 8:
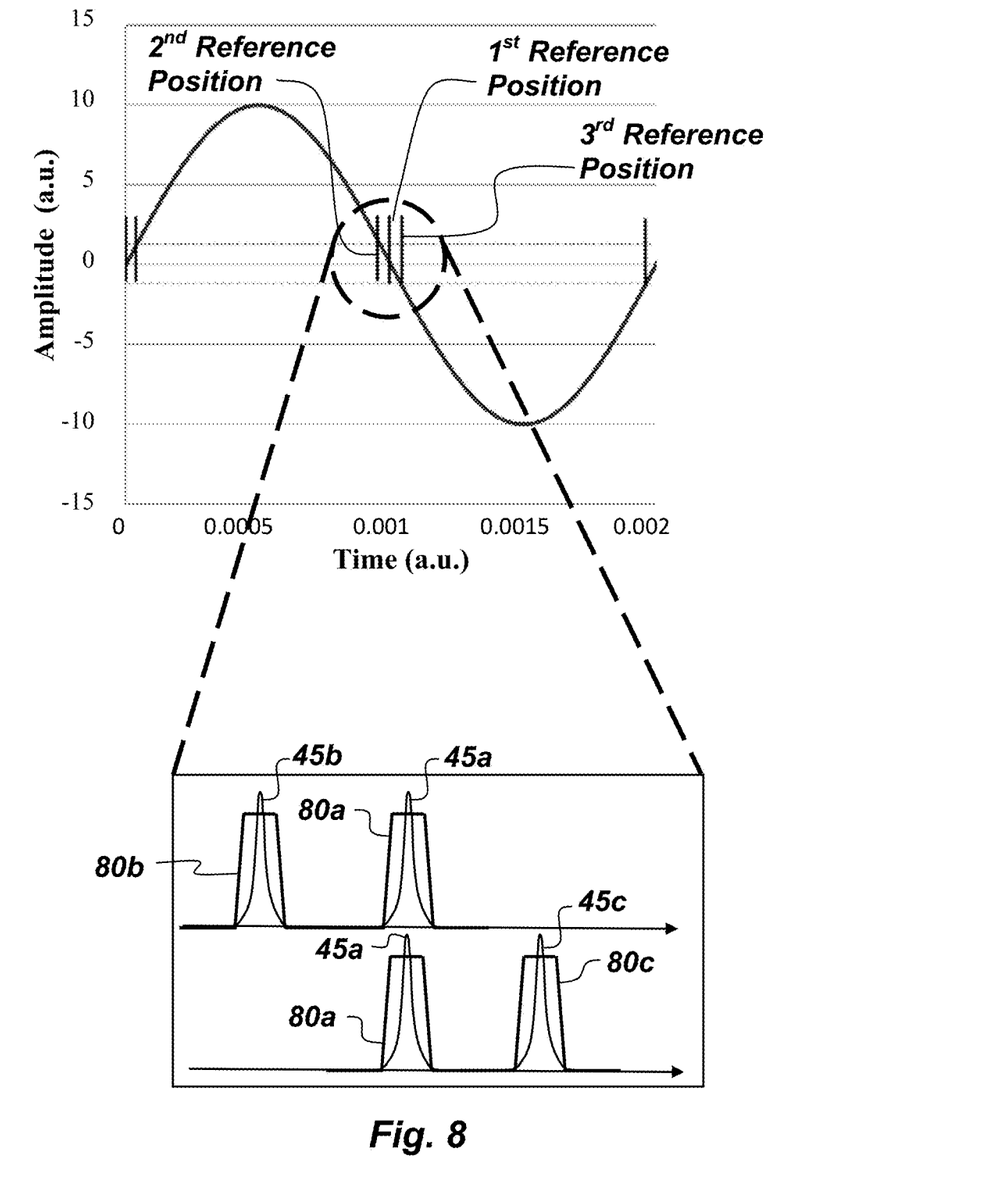
FIG. 8 is a plot of the oscillation amplitude over time of a time domain digital trigger.

FIG. 8 shows how the tunneling discharge current pulses 45a, 45b, and 45c may be amplified to the rails. The width of the tunneling discharge pulse can be of very short duration due to the exponential behavior of the quantum tunneling effect given by Equation 1:

$$I = KUe^{-\beta d} \quad \text{(Eqn. 1)}$$

where:
I is output current;
U is the applied tunneling bias voltage;
d is the tunneling gap width;
K is a constant describing density of available states both source and destination; and)
β is a constant describing the electron work function or the energy that is required to free an electron to vacuum potential.

This very short impulse helps to precisely pinpoint the exact moment in time the first sense mass 28 passes the first reference position, illustrated in FIG. 2A. As the pulses may differ in amplitude due to, for example, variations in applied tunneling voltage (voltage noise) and/or tunneling distance, low noise current amplifiers may be used to amplify the discharge current pulses 45a, 45b, and 45c to the rail (that is the maximum current level value of the sensing circuit) so as to produce the amplified pulses 80a, 80b, and 80c, which exhibit substantially rectangular shapes. Although the amplitude information is lost, the amplified square pulses are advantageously well suited for interfacing with digital circuits and/or yet other more sophisticated devices such as digital signal processors.

From the above description of the inertial device 10, it is manifest that various techniques may be used for implementing the concepts of inertial device 10 without departing from its scope. The described embodiments are to be considered in all respects as illustrative and not restrictive. It should also be understood that inertial device 10 is not limited to the particular embodiments described herein, but is capable of many embodiments without departing from the scope of the claims.

What is claimed is:

1. An in-plane, monolithically-integrated, inertial device comprising:
   a support structure;
   a first spring mass system springedly coupled to the support structure, wherein the first spring mass system is configured to use a first time domain digital trigger operatively coupled between a first drive mass and a first sense mass to measure rotation of the support structure about a first axis, and wherein the first spring mass system is further configured to use a second time domain digital trigger operatively coupled between the support structure and the first drive mass to measure acceleration of the support structure in a second direction that corresponds to direction along a second axis, which is orthogonal to the first axis; and
   a second spring mass system springedly coupled to the support structure, wherein the second spring mass system is configured to use a third time domain digital trigger operatively coupled between a second drive mass and a second sense mass to measure rotation of the support structure about the second axis, and wherein the second spring mass system is further configured to use a fourth time domain digital trigger operatively coupled between the support structure and the second drive mass to measure acceleration of the support structure in a first direction that corresponds to direction along the first axis.

2. The device of claim 1, wherein:
   the first drive mass is springedly coupled to the support structure such that movement of the first drive mass with respect to the support structure is substantially restricted to movement in the second direction, and wherein the first drive mass is driven to oscillate with respect to the support structure in the second direction; and
   the first sense mass is springedly coupled to the first drive mass such that movement of the first sense mass with respect to the first drive mass is substantially restricted to movement in a third direction corresponding to direction along a third axis that is orthogonal to the first and second axes.

3. The device of claim 2, wherein:
   the second drive mass is springedly coupled to the support structure such that movement of the second drive mass with respect to the support structure is substantially restricted to movement in the first direction, and wherein the second drive mass is driven to oscillate with respect to the support structure in the first direction; and
   the second sense mass is springedly coupled to the second drive mass such that movement of the second sense mass with respect to the second drive mass is substantially restricted to movement in the third direction.

4. The device of claim 3, wherein:
the first digital trigger is configured to switch from an open state to a closed state each time the first sense mass is in a reference position with respect to the first drive mass;
the second digital trigger is configured to switch from an open state to a closed state each time the first drive mass is in a reference position with respect to the support structure;
the third digital trigger is configured to switch from an open state to a closed state each time the second sense mass is in a reference position with respect to the second drive mass; and
the fourth digital trigger is configured to switch from an open state to a closed state each time the second drive mass is in a reference position with respect to the support structure.

5. The device of claim 4, wherein the second spring mass system is further configured to use a fifth time domain digital trigger operatively coupled between the second drive mass and a third sense mass to measure rotation of the support structure about the third axis.

6. The device of claim 5, wherein:
the third sense mass is springedly coupled to the second drive mass such that movement of the third sense mass with respect to the second drive mass is substantially restricted to movement in the second direction; and
the fifth digital trigger is configured to switch from an open state to a closed state each time the third sense mass is in a reference position with respect to the second drive mass.

7. The device of claim 6, further comprising an accelerometer configured to measure acceleration of the support structure in the third direction, wherein the accelerometer comprises a fourth sense mass and a sixth time domain digital trigger, wherein the fourth sense mass is springedly coupled to the support structure such that movement of the fourth sense mass with respect to the support structure is substantially restricted to movement in the third direction, and wherein the sixth time domain digital trigger is configured to switch from an open state to a closed state each time the fourth sense mass is in a reference position with respect to the support structure.

8. The device of claim 7, wherein all of the digital triggers are multiple-reference-position electron-tunneling-tip proximity switches, wherein each switch experiences at least two closed states with each relative oscillation between the respective elements to which each proximity switch is coupled.

9. The device of claim 8, further comprising a dual-mass resonator that is springedly coupled to the support structure, wherein the dual-mass resonator is configured to use a seventh time domain digital trigger to provide a clock signal, and wherein the dual-mass resonator comprises:
a first oscillator mass configured to oscillate with respect to the support structure;
a first oscillator driver configured to drive the first oscillator mass to oscillate with respect to the support structure at the first oscillator mass' resonant frequency;
a second oscillator mass having substantially the same resonant frequency as the first oscillator mass, wherein the first and second oscillator masses are designed to respond in substantially the same manner to external perturbations to the support structure;
wherein the seventh digital trigger comprises a seventh electron-tunneling-tip switch coupled between the first oscillator mass and the second oscillator mass; and
wherein as the first oscillator mass oscillates there is relative motion between the first and second oscillator masses such that the seventh switch passes through a closed state in each oscillation when the first and second oscillator masses pass by each other.

10. The device of claim 9, wherein the support structure, the dual sense mass gyroscope, the single sense mass gyroscope, the accelerometer, and the dual mass resonator are sealed in a vacuum between two capping wafers.

11. A method for providing a single monolithic device to measure the rotation of a support structure about first, second, and third axes of a three-axis orthogonal coordinate system as well as the acceleration of the support structure in first, second, and third directions corresponding to directions along the first, second, and third axes respectively, the method comprising the following steps:
driving a first drive mass to oscillate with respect to the support structure in the second direction;
measuring rotation of the support structure about the first axis by monitoring a time interval between successive trigger events from a first pair of third-direction-stacked proximity switches coupled between the first drive mass and a first sense mass which is springedly coupled to the first drive mass such that movement of the first sense mass with respect to the first drive mass is substantially restricted to movement in the third direction;
measuring acceleration of the support structure in the second direction by monitoring a time interval between successive trigger events from a second pair of second-direction-stacked proximity switches coupled between the first drive mass and the support structure;
driving a second drive mass to oscillate with respect to the support structure in the first direction;
measuring rotation of the support structure about the second axis by monitoring a time interval between successive trigger events from a third pair of third-direction-stacked proximity switches coupled between the second drive mass and a second sense mass which is springedly coupled to the second drive mass such that movement of the second sense mass with respect to the second drive mass is substantially restricted to movement in the third direction;
measuring acceleration of the support structure in the first direction by monitoring a time interval between successive trigger events from a fourth pair of first-direction-stacked proximity switches coupled between the second drive mass and the support structure;
measuring rotation of the support structure about the third axis by monitoring a time interval between successive trigger events from a fifth pair of second-direction-stacked proximity switches coupled between the second drive mass and a third sense mass which is springedly coupled to the second drive mass such that movement of the third sense mass with respect to the second drive mass is substantially restricted to movement in the second direction;
driving a fourth sense mass to oscillate with respect to the support structure in the third direction at the fourth sense mass' resonant frequency; and
measuring acceleration of the support structure in the third direction by monitoring a time interval between successive trigger events from a sixth pair of third-direction-stacked proximity switches coupled between the fourth sense mass and the support structure.

12. The method of claim 11, further comprising the steps of:

driving a first oscillator mass to oscillate with respect to the support structure at the first oscillator mass' resonant frequency;

generating a clock signal by monitoring each closed state of a resonator proximity switch that is coupled between the first oscillator mass and a second oscillator mass, wherein the second oscillator mass has substantially the same resonant frequency as the first oscillator mass and the second oscillator mass oscillates out of phase with the first oscillator mass, and wherein the first and second oscillator masses are designed to respond in substantially the same manner to external perturbations to the support structure, and wherein the resonator proximity switch switches from an open state to a closed state each time the first and second oscillator masses are in a reference position with respect to each other.

13. The method of claim 12, wherein the time intervals are measured based on the clock signal.

14. The method of claim 13, further comprising the step of calculating the amplitude of a given rotation of the support structure based on the corresponding time interval between successive trigger events.

15. The method of claim 14, further comprising the step of calculating the amplitude of an acceleration of the support structure in a given direction based on the corresponding time interval between successive trigger events.

16. A method for providing a monolithic device to measure the rotation of the device about x, y, and z mutually orthogonal axes as well as the acceleration of the support structure in x, y, and z directions corresponding to directions along the x, y, and z axes respectively, the method comprising the following steps:

forming a support structure in the xy plane of a substrate;

forming in the xy plane of the substrate a single-sense-mass gyroscope that is springedly coupled to the support structure, wherein the single-sense-mass gyroscope is configured to use a first time domain digital trigger to measure rotations of the support structure about the x-axis, and wherein the single-sense-mass gyroscope is further configured to use a second time domain digital trigger to measure acceleration of the support structure in the y-direction;

forming in the xy plane of the substrate a dual-sense-mass gyroscope that is springedly coupled to the support structure, wherein the dual-sense-mass gyroscope is configured to use a third and fifth time domain digital triggers to measure rotations of the support structure about the y- and z-axes respectively, and wherein the dual-sense-mass gyroscope is further configured to use a fourth time domain digital trigger to measure acceleration of the support structure in the x-direction;

forming in the xy plane of the substrate an accelerometer that is springedly coupled to the support structure, wherein the accelerometer is configured to use a sixth time domain digital trigger to measure acceleration of the support structure in the z-direction; and forming in the xy plane of the substrate a dual-mass resonator that is springedly coupled to the support structure, wherein the dual-mass resonator is configured to use a seventh time domain digital trigger to generate a clock signal.

17. The method of claim 16, wherein the single-mass gyroscope comprises:

a first drive mass springedly coupled to the support structure;

a first drive mass driver configured to drive the first drive mass to oscillate with respect to the support structure in approximately only the y-direction;

a first sense mass springedly coupled to the first drive mass, wherein the first sense mass is configured to move with respect to the first drive mass in approximately only the z-direction in response to Coriolis forces from rotation of the support structure about the x-axis;

wherein the first digital trigger comprises a first pair of z-direction-stacked proximity switches coupled between the first drive mass and the first sense mass, wherein the first digital trigger is configured to pass from an open state to closed state at least twice during each oscillation of the first sense mass with respect to the first drive mass such that rotation and rotation rate of the support structure about the x-axis may be determined by measuring the time interval between closed states of the first pair of proximity switches; and wherein the second digital trigger comprises a second pair of y-direction-stacked proximity switches coupled between the first drive mass and the support structure, wherein the second digital trigger is configured to pass from an open state to closed state at least twice during each oscillation of the first drive mass with respect to the support structure such that acceleration and displacement amplitude of the support structure in the y-direction may be determined by measuring the time interval between closed states of the second pair of proximity switches.

18. The method of claim 17, wherein the dual-mass gyroscope comprises:

a second drive mass springedly coupled to the support structure;

a second drive mass driver configured to drive the second drive mass to oscillate with respect to the support structure in approximately only the x-direction;

a second sense mass springedly coupled to the second drive mass, wherein the second sense mass is configured to move with respect to the second drive mass in approximately only the z-direction in response to Coriolis forces from rotation of the support structure about the y-axis;

a third sense mass springedly coupled to the second drive mass, wherein the third sense mass is configured to move with respect to the second drive mass in approximately only the y-direction in response to Coriolis forces from rotation of the support structure about the z-axis;

wherein the third digital trigger comprises a third pair of z-direction-stacked proximity switches coupled between the second drive mass and the second sense mass, wherein the third digital trigger is configured to pass from an open state to closed state at least twice during each oscillation of the second sense mass with respect to the second drive mass such that rotation and rotation rate of the support structure about the y-axis may be determined by measuring the time interval between closed states of the third pair of proximity switches;

wherein the fourth digital trigger comprises a fourth pair of x-direction-stacked proximity switches coupled between the second drive mass and the support structure, wherein the fourth digital trigger is configured to pass from an open state to closed state at least twice during each oscillation of the second drive mass with respect to the support structure such that acceleration and displacement amplitude of the support structure in the x-direction may be determined by measuring the time interval between closed states of the fourth pair of proximity switches; and wherein the fifth digital trigger comprises a fifth pair of y-direction-stacked proximity switches coupled between the second drive mass and the third sense mass, wherein the fifth digital trigger is configured to pass from an open state to closed state at least twice during each oscillation of the third sense mass with respect to the second drive mass such that rotation and rotation rate of the support structure about the z-axis may be determined by measuring the time interval between closed states of the fifth pair of proximity switches.

19. The method of claim 18, wherein the accelerometer comprises:

a fourth sense mass springedly coupled to the support structure, wherein the fourth sense mass is configured to move with respect to the support structure in approximately only the z-direction in response to accelerations of the support structure in the z-direction;

an accelerometer driver configured to drive the fourth sense mass to oscillate with respect to the support structure at the fourth sense mass' resonant frequency in approximately only the z-direction; and wherein the sixth digital trigger comprises a sixth pair of z-direction-stacked proximity switches coupled between the fourth sense mass and the support structure, wherein the sixth digital trigger is configured to pass from an open state to closed state at least twice during each oscillation of the fourth sense mass with respect to the support structure such that acceleration and displacement amplitude of the support structure in the z-direction may be determined by measuring the time interval between closed states of the sixth pair of proximity switches.

20. The method of claim 19, wherein the dual-mass resonator comprises:

a first oscillator mass configured to oscillate with respect to the support structure;

a first oscillator driver configured to drive the first oscillator mass to oscillate with respect to the support structure at the first oscillator mass' resonant frequency;

a second oscillator mass having substantially the same resonant frequency as the first oscillator mass, wherein the first and second oscillator masses are designed to respond in substantially the same manner to external perturbations to the support structure;

wherein the seventh digital trigger comprises a seventh proximity switch coupled between the first oscillator mass and the second oscillator mass; and wherein as the first oscillator mass oscillates there is relative motion between the first and second oscillator masses such that the seventh switch is configured to pass from an open state to closed state during each oscillation of the first oscillator mass with respect to the second oscillator mass.

* * * * *